(12) United States Patent
Kimura

(10) Patent No.: US 7,020,967 B2
(45) Date of Patent: Apr. 4, 2006

(54) ROD CUTTING DEVICE

(75) Inventor: Kiyoshi Kimura, Fujisawa (JP)

(73) Assignee: Kabushiki Kaisha Ogura, Kanagawa-Ken (JP)

( * ) Notice: Subject to any disclaimer, the term of this patent is extended or adjusted under 35 U.S.C. 154(b) by 0 days.

(21) Appl. No.: 10/139,276

(22) Filed: May 7, 2002

(65) Prior Publication Data

US 2002/0166237 A1    Nov. 14, 2002

(30) Foreign Application Priority Data

May 8, 2001    (JP) .............................. 2001-137434

(51) Int. Cl.
*B23D 23/00*    (2006.01)
(52) U.S. Cl. .............................. 30/95; 30/124; 30/131; 30/208
(58) Field of Classification Search .......... 30/131–135, 30/95–97, 208, 210, 241, 124; 81/418, 421
See application file for complete search history.

(56) References Cited

U.S. PATENT DOCUMENTS

| | | | | |
|---|---|---|---|---|
| 3,766,647 A | * | 10/1973 | Steiner ......................... | 30/410 |
| 3,777,398 A | * | 12/1973 | Routh, Jr. ..................... | 30/124 |
| 3,800,345 A | * | 4/1974 | Feliz ........................... | 81/3.09 |
| 3,908,268 A | * | 9/1975 | Brown ......................... | 30/124 |
| 3,922,781 A | * | 12/1975 | Tippy ........................... | 30/124 |
| 4,395,824 A | * | 8/1983 | Puro ............................ | 30/134 |
| 5,457,889 A | * | 10/1995 | Kimura ........................ | 83/605 |
| 5,966,815 A | * | 10/1999 | Sheikh ......................... | 30/124 |

FOREIGN PATENT DOCUMENTS

| | | |
|---|---|---|
| DE | 94 21 047 | 7/1995 |
| DE | 195 15 955 A1 | 11/1995 |
| JP | 63127810 | 5/1988 |
| JP | 01-135410 | 5/1989 |
| JP | 08-174331 | 7/1996 |
| JP | 10202418 * | 8/1998 |

* cited by examiner

*Primary Examiner*—Stephen Choi
(74) *Attorney, Agent, or Firm*—Dickstein Shapiro Morin & Oshinksy LLP

(57) ABSTRACT

A rod cutting device includes a cutting head including a stationary cutting blade and a movable cutting blade for cutting off a waste part of a rod, and a waste part holding mechanism disposed near a cutting operation completing position, toward which the movable cutting chip is moved toward complete a rod cutting operation, to hold the part of the rod that has been cut off. The waste part holding mechanism employs a magnetic holding member for holding a waste part of a magnetic material or a resilient holding member for holding a waste part of a nonmagnetic material. The part of the rod that has been cut off is held and prevented from dropping by the waste part holding mechanism.

14 Claims, 4 Drawing Sheets

ROD CUTTING DEVICE

BACKGROUND OF THE INVENTION

1. Field of the Invention

The present invention relates to a rod cutting device for cutting a rod and, more particularly, to a rod cutting device provided with holding means for holding a part of a rod that has been cut off.

2. Description of the Related Art

A variety of cutting devices for cutting rods, such as reinforcing bars, bolts and nonmetallic bars, with a set of a stationary cutting blade and a movable cutting blade have been developed. A threaded rod is used for suspending an air conditioning unit or a lighting fixture from the ceiling. A stud end part of the threaded rod is set into the ceiling or the wall, and then the threaded rod is cut to form an outer end part of a desired length by on-site work.

Threaded rod cutting devices for cutting such threaded rods are disclosed in, for example, JP-B No. 16966/1993 and JP-A No. 174331/1996. These threaded rod cutting device may be held by one or both of operator's hands, a cutting head of the full-threaded bolt cutting device is put to a desired part of the totally threaded bolt to cut the outer end part of the full-threaded bolt in a desired length at a construction site or the like. When a part of such a threaded rod is cut off, the waste part drops. It is possible, when the threaded rod is thus cut at a high place, such as at ceiling-height, that the waste part hits and injures a worker working below. The dropped waste part is very dangerous when it is relatively long. Moreover, the dropped waste part may damage the floor or may drop into other device.

SUMMARY OF THE INVENTION

The present invention has been made in view of the foregoing problem and it is therefore an object of the present invention to provide a rod cutting device capable of holding a cut-off portion of a rod to prevent the cut-off portion from dropping.

According to one aspect of the present invention, a rod cutting device includes: a cutting head including a stationary cutting blade and a movable cutting blade for cutting off a waste part of a rod, and a waste part holding means disposed near a cutting operation completing position, toward which the movable cutting blade is moved to complete a rod cutting operation, to hold the waste part cut off the rod by its cut end part.

The waste part holding means of the rod cutting device holds the waste part with its axis extended substantially in parallel to the axis of the rod.

BRIEF DESCRIPTION OF THE DRAWINGS

The above and other objectives, features and advantages of the present invention will become more apparent from the following description taken in connection with the accompanying drawings, in which.

DESCRIPTION OF THE PREFERRED EMBODIMENTS

Figure 1:
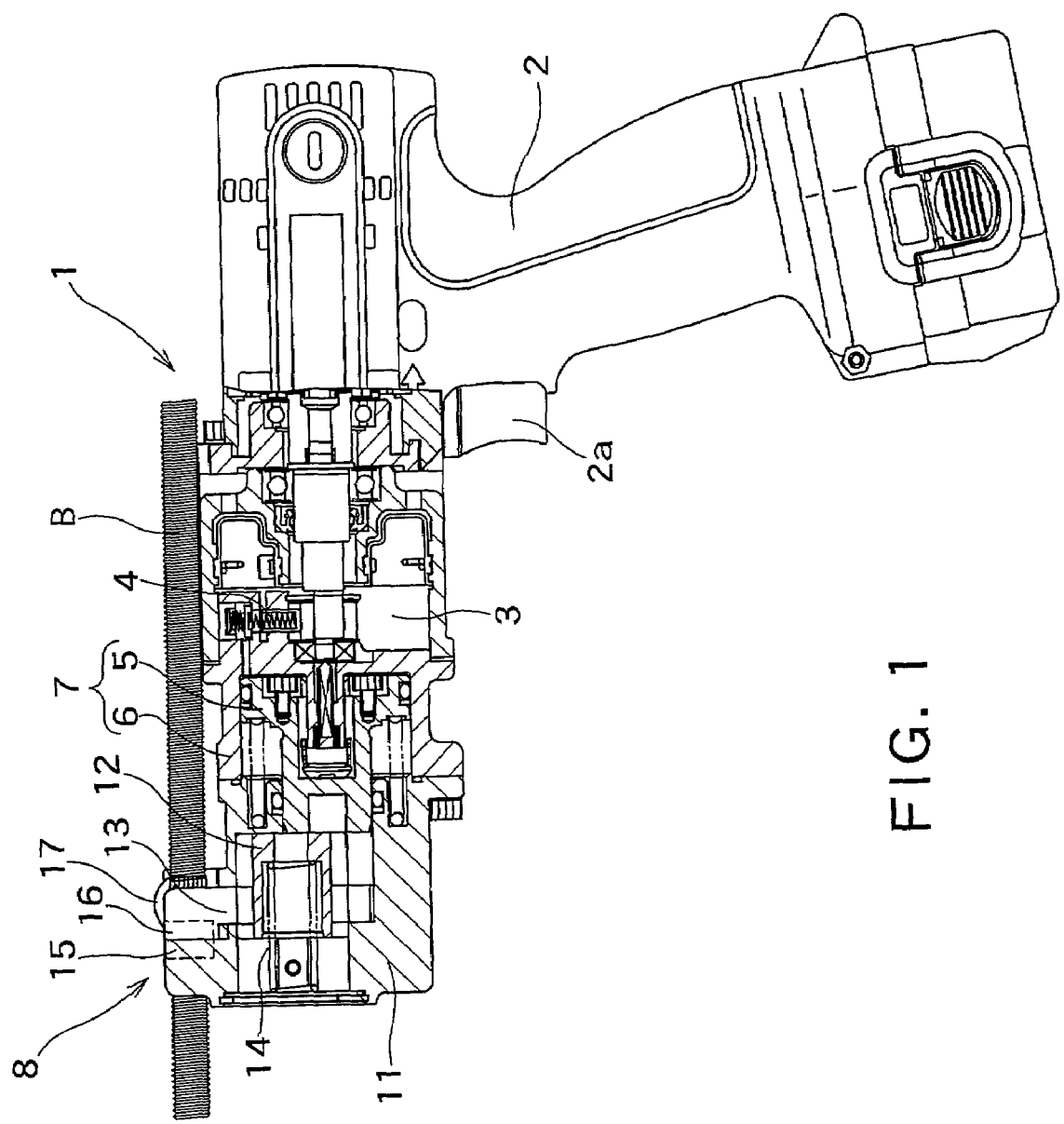
FIG. 1 is a longitudinal sectional view of a rod cutting device in a first embodiment according to the present invention.

Referring to FIG. 1 showing a rod cutting device 1 in a first embodiment according to the present invention in a longitudinal sectional view, the rod cutting device 1 includes an electric motor 2 provided with a built-in battery, being capable of being held by one hand, a hydraulic mechanism 4 to be rotationally driven by the electric motor 2 to pressurize a working fluid contained in a built-in tank 3, a hydraulic driving mechanism 7 including a piston 5 to be advanced by the working fluid supplied from the built-in tank 3, and a cylinder 6 in which the piston 5 is fitted, and a cutting head 8 to be driven by the hydraulic driving mechanism 7 to cut a rod.

Figure 2:
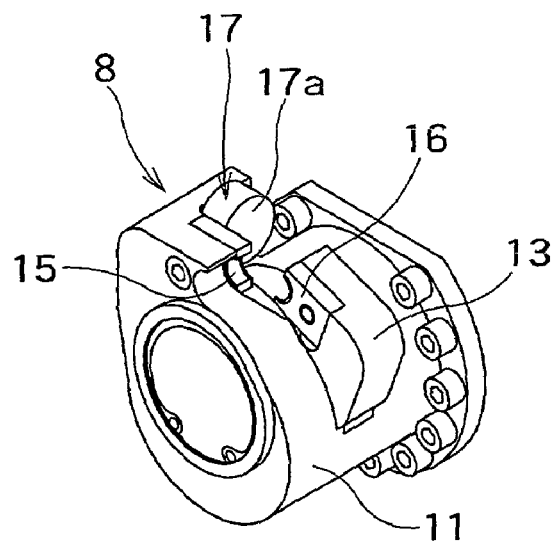
FIG. 2 is a perspective view of a cutting head included in the rod cutting device shown in FIG. 1.

The cutting head 8 has a casing 11 having a shape substantially resembling a hollow cylinder as shown in FIG. 2 and connected to the hydraulic driving mechanism 7. A rotary drive shaft 12 provided with a helical groove in its circumference is extended in the casing 11 so as to be able to reciprocate axially along an axis parallel to the axis of the piston 5. A cutting arm 13, provided with a groove engaging the helical groove of the rotary drive shaft 12, is supported for turning about the axis of the rotary drive shaft 12. The front end of the piston 5 is in contact with the rear end of the rotary drive shaft 12. The rotary drive shaft 12 is biased backward, i.e., toward the piston 5, by a return spring 14.

When the piston 5 is advanced by force exerted thereon by the working fluid, the rotary drive shaft 12 advances to turn the cutting arm 13 engaging in the helical groove thereof in a cutting direction for a cutting action. When the force of the hydraulic fluid exerted on the piston 5 is removed and the piston 5 is allowed to return to its initial position, the return spring 14 moves the rotary drive shaft 12 backward and, consequently, the cutting arm 13 is turned in a returning direction opposite to the cutting direction.

A stationary cutter blade 15 is fixed to a part of the casing 11 at a radial distance from the axis of the rotary drive shaft 12. A movable cutting blade 16 is fixed to a free end of the cutting arm 13. The stationary cutting blade 15 and the movable cutting blade 16 are semicircular, concave working surfaces provided with an internal thread corresponding to the external thread of a threaded rod B to avoid damaging the threads of the threaded rod B when cutting the threaded rod B. A magnet 17 having a flat surface 17a is disposed at a position near a position where the movable cutting blade 16 stops at the completion of the cutting action and is attached to the casing 11 with the flat surface 17a extended substantially perpendicularly to the moving direction of the movable cutting blade 16.

Although the magnet 17 having the flat surface 17a employed in the first embodiment has a cylindrical shape, the magnet 17 may have a square shape. The magnet 17 may have a curved surface of a radius of curvature corresponding to the diameter of the threaded rod B instead of the flat surface 17a to enhance the ability of the magnet 17 in magnetically attracting and holding the threaded rod B.

Figure 3:
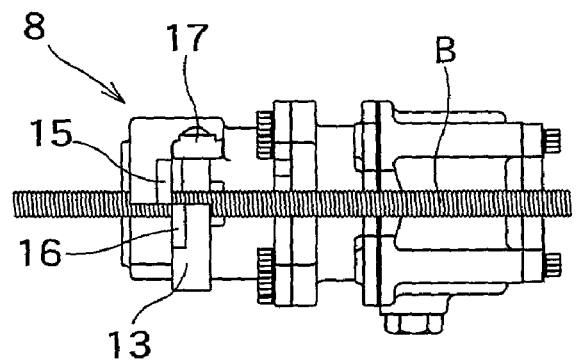
FIG. 3 is a top view of a front part of the rod cutting device shown in FIG. 1.
Figure 4:
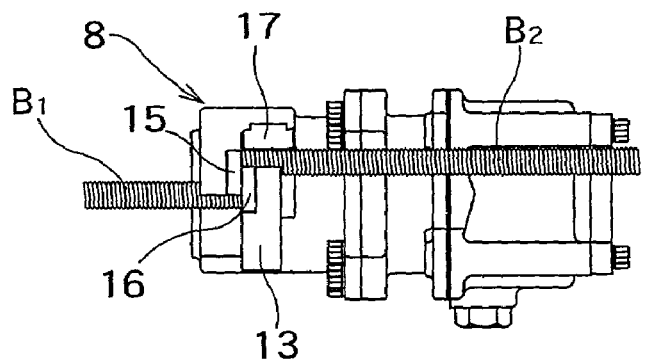
FIG. 4 is a top view of the front part of the rod cutting device shown in FIG. 3 in a state immediately after the completion of a rod cutting operation.
Figure 5:
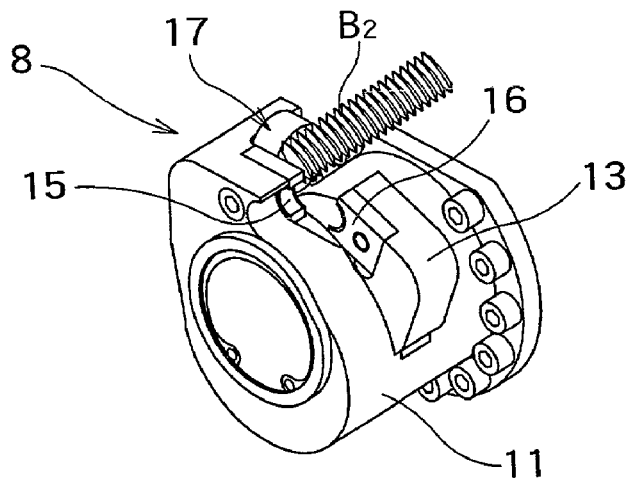
FIG. 5 is a perspective view of the cutting head holding a waste part cut off a rod.

The operation of the rod cutting device 1 will be described with reference to FIGS. 3 to 5. Referring to FIG. 3, the movable cutting blade 16 is held at its initial position, and the rod cutting device 1 is disposed such that the stationary cutting blade 15 is put to a part of threaded rod B to be cut. Then a switching trigger 2a is depressed to start the electric motor 2. Consequently, the hydraulic mechanism 4 supplies the pressurized working fluid to the hydraulic driving mechanism 7, so that the piston 5 is advanced and the cutting arm 13 is turned in a cutting direction. Then, the threaded rod B is sheared by the cooperative shearing operation of the stationary cutting blade 15 and the movable cutting blade 16. Thus, the threaded rod B is divided into a stud end part $B_1$ set into the ceiling or the wall, and a waste part $B_2$ cut off the threaded rod B. As the cutting arm 13 is turned to the magnet 17, the waste part $B_2$ is carried toward the magnet 17 and, finally, the waste part $B_2$ is held between the moving cutting blade 16 and the magnet 17. After the cutting operation for cutting the threaded rod B has been completed, the electric motor 2 is stopped. Then, the cutting arm 13 is turned automatically to its initial position and the movable cutting blade 16 is separated from the waste part $B_2$. The waste part $B_2$ is magnetically attracted to and held by the flat surface 17a of the magnet 17 to prevent the waste part $B_2$ from dropping.

Figure 6:
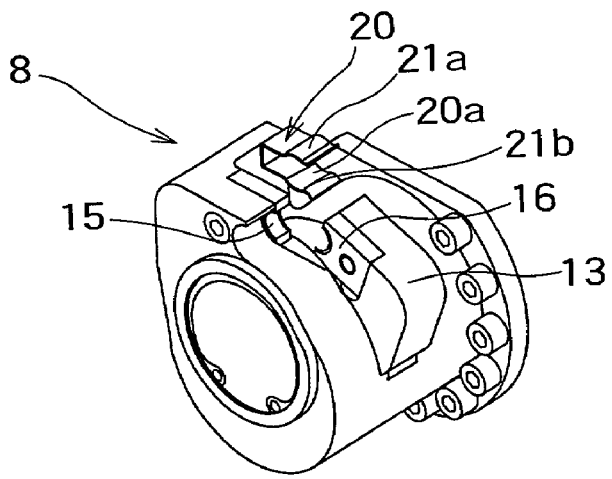
FIG. 6 is a perspective view of a cutting head included in a rod cutting device in a second embodiment according to the present invention.
Figure 7:
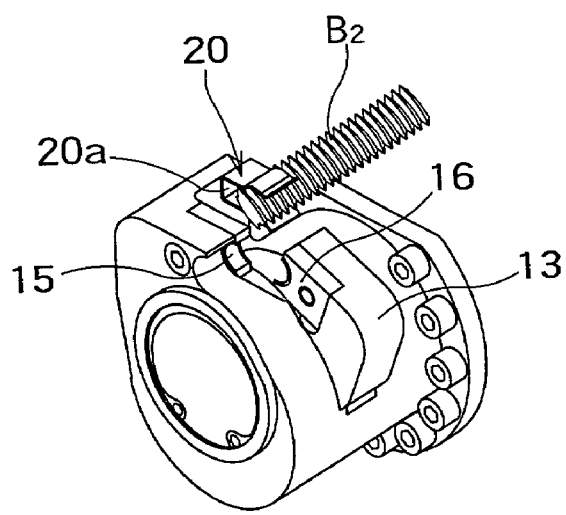
FIG. 7 is a perspective view of the cutting head shown in FIG. 6 holding a waste part cut off a rod.

FIG. 6 is a perspective view, similar to FIG. 2, of a cutting head 8 included in a rod cutting device in a second embodiment according to the present invention. The rod cutting device in the second embodiment employs a gripping member 20, i.e., a resilient holding member, instead of the magnet 17. The gripping member 20 has a pair of opposite elastic holding arms 21a and 21b having the shape of a plate and defining a rod holding space 20a. The gripping member 20 is disposed such that a line extending between the free ends of the elastic holding arms 21a and 21b is perpendicular to the axis of a waste part $B_2$ cut off of a threaded rod B.

When the threaded rod B is sheared, the waste part $B_2$ is forced into the space 20a between the elastic holding arms 21a and 21b of the gripping member 20 and is held between the pair of elastic holding arms 21a and 21b. Thus, the rod cutting device in the second embodiment is capable of holding the waste part $B_2$ even if the waste part $B_2$ is formed of a nonmagnetic material, such as a nonmetallic material or a stainless steel. A gripping member having a pair of elastic holding arms having the shape of a pin may be employed instead of the gripping member 20 having the elastic holding arms 21a and 21b having the shape of a plate. A plurality of gripping members may be arranged in parallel to the axis of the waste part $B_2$.

Figure 8:
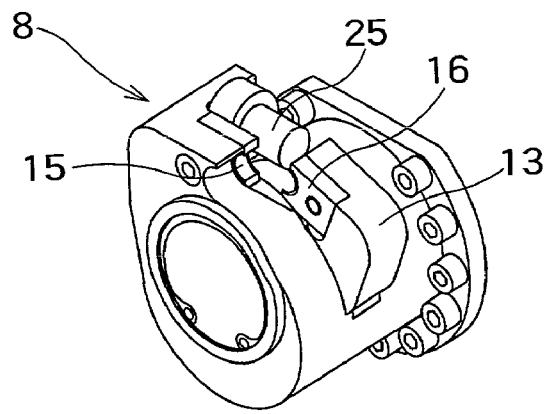
FIG. 8 is a perspective view of a cutting head included in a rod cutting device in a third embodiment according to the present invention.
Figure 9:
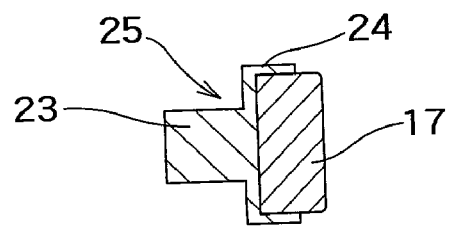
FIG. 9 is a sectional view of a resilient holding member employed in the rod cutting device in the third embodiment.
Figure 10:
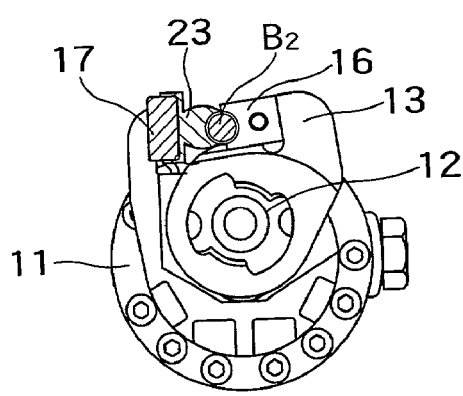
FIG. 10 is a front elevated view of the cutting head shown in FIG. 8 holding a waste part cut off a rod.

FIGS. 8 to 10 show the components of a rod cutting device in a third embodiment according to the present invention. A cutting head 8 included in the rod cutting device in the third embodiment is provided with a magnet 17, similar to that of the rod cutting device in the first embodiment, and a resilient member 25 capable of being detachably connected to the magnet 17. As shown in FIG. 9, the resilient member 25 is formed of a resilient material, such as rubber, and has a cylindrical holding part 23, and an annular connecting part 24 formed integrally with the cylindrical holding part 23.

When cutting a nonmagnetic threaded rod formed of a nonmagnetic material, such as a stainless steel, the annular connecting part 24 is put on the magnet 17 to connect the resilient member 25 to the magnet 17. In a state where a cutting arm 13 has reached a stopping position and a waste part $B_2$ has been cut off the threaded rod B, the waste part $B_2$ is held between the resiliently deformed cylindrical holding part 23 and a movable cutting blade 16 attached to the cutting arm 13 as shown in FIG. 10, and hence the waste part $B_2$ is unable to drop. When cutting a threaded bolt made from a magnetic material, the resilient member 25 is removed from the magnet 17, and only the magnet 17 is used for holding the waste part $B_2$.

Figure 11:
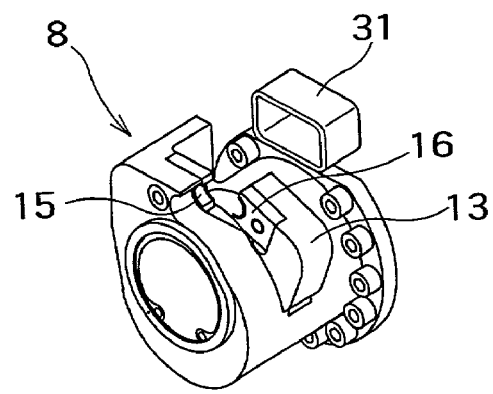
FIG. 11 is a perspective view of a cutting head included in a rod cutting device in a fourth embodiment according to the present invention.

FIG. 11 shows a cutting head 8 included in a rod cutting device in a fourth embodiment according to the present invention. A casing 11 included in the cutting head 8 shown in FIG. 11 is provided with a waste container 31 disposed behind a cutting arm 13 holding a movable cutting blade 16 to catch a dropping part that has been cut. The waste container 31 may be a basket as shown in FIG. 11 or a flexible bag.

As apparent from the foregoing description, according to the present invention, the rod cutting device cuts a rod with the cutting head provided with the stationary cutting blade and the movable cutting blade, and holds the part of the rod that has been cut off by the waste part holding means disposed near the position where the movable cutting blade completes its cutting operation. Thus, the part of the rod that has been cut off is prevented from dropping. Naturally, the rod cutting device is generally applicable to cutting rod-shaped materials other than the a threaded rod.

What is claimed is:

1. A rod cutting device comprising:
   a cutting head including:
      a stationary cutting blade; and
      a movable cutting blade for cutting off an unsupported end of a rod, the rod also having a supported end, and
   a waste part holding means fixed to a casing holding the stationary cutting blade and near a cutting operation completing position of the movable cutting blade, the movable cutting blade being arranged to be moved past the stationary blade and toward the waste part holding means to complete a rod cutting operation, said waste part holding means holding the unsupported end of the rod that has been cut off by its cut end part.

2. The rod cutting device according to claim 1, wherein the waste part holding means holds the unsupported end with its axis extended substantially in parallel to an axis of the rod.

3. The rod cutting device according to claim 2, wherein the waste part holding means comprises a pair of opposite elastic holding arms respectively having base ends connected together so as to define a rod-receiving space, and the waste part holding means is disposed such that a line extending between free ends of the elastic holding arms is perpendicular to the axis of the waste part.

4. The rod cutting device according to claim 3, wherein the elastic holding arms of the waste part holding means have the shape of a plate.

5. The rod cutting device according to claim 3, wherein the elastic holding arms of the waste part holding means have the shape of a pin.

6. The rod cutting device according to claim 1, wherein the waste part holding means comprises a magnetic member having an attracting part extending substantially perpendicularly to a moving direction of the movable cutting blade.

7. The rod cutting device according to claim 6 further comprising a resilient member detachably connected to the attracting part of the magnetic member.

8. The rod cutting device according to claim 1, wherein the waste part holding means is arranged to hold the unsupported end with the movable cutting blade held in an initial position away from the waste part holding means.

9. The rod cutting device according to claim 1, wherein the movable cutting blade has an axis of cutting rotation, the rod cutting device further comprising a drive shaft for the movable cutting blade arranged to reciprocate axially, parallel to the axis of cutting rotation.

10. The rod cutting device according to claim 1, wherein the movable cutting blade is arranged to turn in a cutting direction, and shear the rod in cooperation with the stationary cutting blade to form the unsupported end of the rod, the movable cutting blade being arranged and configured to carry the unsupported end of the rod to the waste part holding means.

11. The rod cutting device according to claim 1, wherein the cutting head consists essentially of the stationary cutting blade and the movable cutting blade.

12. The rod cutting device according to claim 1, wherein the waste part holding means is located such that the unsupported end is held between the waste part holding means and the movable cutting blade when the movable cutting blade is moved to the cutting operation completing position.

13. The rod cutting device according to claim 1, wherein the rod cutting operation cuts the rod in one place.

14. The rod cutting device according to claim 1, wherein the movable cutting blade is configured to engage and carry the unsupported end cut from the rod to the waste part holding means.

* * * * *